(12) United States Patent
Marshall et al.

(10) Patent No.: US 9,449,272 B2
(45) Date of Patent: Sep. 20, 2016

(54) DOPPLER EFFECT PROCESSING IN A NEURAL NETWORK MODEL

(71) Applicant: QUALCOMM Incorporated, San Diego, CA (US)

(72) Inventors: Robert William Marshall, San Diego, CA (US); Somdeb Majumdar, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 228 days.

(21) Appl. No.: 14/066,570

(22) Filed: Oct. 29, 2013

(65) Prior Publication Data

US 2015/0120628 A1    Apr. 30, 2015

(51) Int. Cl.
*G06N 3/04* (2006.01)

(52) U.S. Cl.
CPC ..................... *G06N 3/049* (2013.01)

(58) Field of Classification Search
CPC ..................................................... G06N 3/049
See application file for complete search history.

(56) References Cited

U.S. PATENT DOCUMENTS

| 5,394,510 A * | 2/1995 | Takatori ................... G06N 3/04 706/20 |
| 5,619,616 A * | 4/1997 | Brady ....................... G01H 3/08 706/20 |
| 6,366,236 B1 | 4/2002 | Farmer et al. |
| 7,930,259 B2 | 4/2011 | Hashimoto et al. |
| 8,959,040 B1 * | 2/2015 | Cruz-Albrecht ....... G06N 3/049 706/39 |
| 2012/0098704 A1 | 4/2012 | Arnoult, Jr. et al. |

FOREIGN PATENT DOCUMENTS

EP    0845686 A2    6/1998

OTHER PUBLICATIONS

Through-Wall Human Tracking With Multiple Doppler Sensors Using an Artificial Neural Network, by Kim, published 2009.*
A 64 Channel Programmable Closed-Loop Neurostimulator With 8 Channel Neural Amplifier and Logarithmic ADC, by Lee, published 2010.*
Multilayer perceptron, Wikipedia, downloaded from the Internet Sep. 1, 2015.*
Neural network analysis of internal carotid arterial Doppler signals: predictions of stenosis and occlusion, by Derya, published 2003.*
Detection of femoral artery occlusion from spectral density of Doppler signals using the artificial neural network, by Kara, published 2005.*
Kim, et al., "Tracking a Moving Target with Multiple Doppler Sensors Using an Artificial Neural Network," 2007 IEEE Antennas and Propagation Society International Symposium, 2007, pp. 1477-1480.

(Continued)

*Primary Examiner* — Stanley K Hill
*Assistant Examiner* — Thomas Fink
(74) *Attorney, Agent, or Firm* — Seyfarth Shaw LLP

(57) ABSTRACT

A method of frequency discrimination associated with the Doppler effect is presented. The method includes mapping a first signal to a first plurality of frequency bins and a second signal to a second plurality of frequency bins. The first signal and the second signal corresponding to different times. The method also includes firing a first plurality of neurons based on contents of the first plurality of frequency bins and firing a second plurality of neurons based on contents of the second plurality of frequency bins.

18 Claims, 14 Drawing Sheets

(56) References Cited

OTHER PUBLICATIONS

Fontaine B., et al., "Bat echolocation processing using first-spike latency coding", Neural Networks, vol. 22, No. 10, May 21, 2009, pp. 1372-1382, XP026761893, DOI: 10.1016 1j.neunet.2009.05.002 figs. 9 and 10; section 4.

Glackin C., et al., "Synchrony: a spiking-based mechanism for processing sensory stimuli", Neural Networks, vol. 32, Feb. 14, 2012, pp. 26-34, XP028517547, DOI: 10.1016/j.neunet.2012.02.020 figs. 5 and 9; sections 3 and 5.2.

Huo J., et al., "Adaptive visual and auditory map alignment in barn owl superior colliculus and its neuromorphic implementation", IEEE Transactions on Neural Networks and Learning Systems, vol. 23, No. 9, Jul. 31, 2012, pp. 1486-1497, XP011471145, DOI: 10.1109/tnnls.2012.2204771 figs. 1-3 and 8.

International Search Report and Written Opinion—PCT/US2014/062257—ISA/EPO—Jun. 3, 2015.

Sheik S., et al., "Emergent auditory feature tuning in a real-time neuromorphic VLSI system", Frontiers in Neuroscience, vol. 6, 17, Dec. 2, 2011, pp. 1-11, XP055191678, DOI: 10.3389/fnins.2012.00017 fig. 1; section 2.

Wall J.A., et al., "Spiking neuron models of the medial and lateral superior olive for sound localisation", Proceedings of the IEEE International Joint Conference on Neural Networks (IJCNN'08), Jun. 1, 2008, pp. 2641-2647, XP031327904, DOI: 10.1109/IJCNN.2008.4634168, the whole document.

\* cited by examiner

DOPPLER EFFECT PROCESSING IN A NEURAL NETWORK MODEL

BACKGROUND

1. Field

Certain aspects of the present disclosure generally relate to neural system engineering and, more particularly, to systems and methods using the Doppler effect in a neural network model.

2. Background

An artificial neural network, which may comprise an interconnected group of artificial neurons (i.e., neuron models), is a computational device or represents a method to be performed by a computational device. Artificial neural networks may have corresponding structure and/or function in biological neural networks. However, artificial neural networks may provide innovative and useful computational techniques for certain applications in which traditional computational techniques are cumbersome, impractical, or inadequate. Because artificial neural networks can infer a function from observations, such networks are particularly useful in applications where the complexity of the task or data makes the design of the function by conventional techniques burdensome. Thus, it is desirable to provide a neuromorphic receiver to calculate a speed and/or velocity of an object based on an increase or decrease in frequency over time.

SUMMARY

In one aspect of the present disclosure, a method of wireless communication is disclosed. The method includes mapping a first signal to a first set of frequency bins and mapping a second signal to a second set of frequency bins. The first signal corresponds to a first time and the second signal corresponds to a second time. A first set of neurons is fired based (at least in part) on contents of the first set of frequency bins. A second set of neurons is fired based (at least in part) on contents of the second set of frequency bins. The first set of neurons corresponds to the first set of frequency bins and the second set of neurons corresponds to the second set of frequency bins. Additionally, the first set of neurons and the second set of neurons correspond to a first layer of neurons of a spiking network. The firing of the first and second sets of neurons is based on a relative speed of an object.

Another aspect discloses wireless communication having a memory and at least one processor coupled to the memory. The processor(s) is configured to map a first signal to a first set of frequency bins and to map a second signal to a second set of frequency bins. The first signal corresponds to a first time and the second signal corresponds to a second time. The processor(s) is further configured to fire a first set of neurons based on contents of the first set of frequency bins and to fire a second set of neurons based on contents of the second set of frequency bins. The first set of neurons corresponds to the first set of frequency bins and the second set of neurons corresponds to the second set of frequency bins. Additionally, the first set of neurons and the second set of neurons correspond to a first layer of neurons of a spiking network. Furthermore, the firing of the first set of neurons and the second set of neurons is based on a relative speed of an object.

In another aspect, an apparatus including means for mapping a first signal to a first set of frequency bins is disclosed. The apparatus also includes means for mapping a second signal to a second set of frequency bins. The first signal corresponds to a first time and the second signal corresponds to a second time. The apparatus also includes means for firing a first set of neurons based on contents of the first set of frequency bins and means for firing a second set of neurons based at least in part on contents of the second set of frequency bins. The first set of neurons corresponds to the first set of frequency bins and the second set of neurons corresponds to the second set of frequency bins. Additionally, the first set of neurons and the second set of neurons correspond to a first layer of neurons of a spiking network. Furthermore, the firing of the first set of neurons and the second set of neurons is based on a relative speed of an object.

Another aspect discloses a computer program product for wireless communications in a wireless network having a non-transitory computer-readable medium. The computer readable medium has non-transitory program code recorded thereon which, when executed by the processor(s), causes the processor(s) to perform operations of mapping a first signal to a first set of frequency bins and mapping a second signal to a second set of frequency bins. The first signal corresponds to a first time and the second signal corresponds to a second time. The program code further causes the processor(s) to fire a first set of neurons based on contents of the first set of frequency bins and to fire a second set of neurons based at least in part on contents of the second set of frequency bins. The first set of neurons corresponds to the first set of frequency bins and the second set of neurons corresponds to the second set of frequency bins. Additionally, the first set of neurons and the second set of neurons corresponds to a first layer of neurons of a spiking network. The firing of the first set of neurons and the second set of neurons is based on a relative speed of an object.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System, Training and Operation

Figure 1:
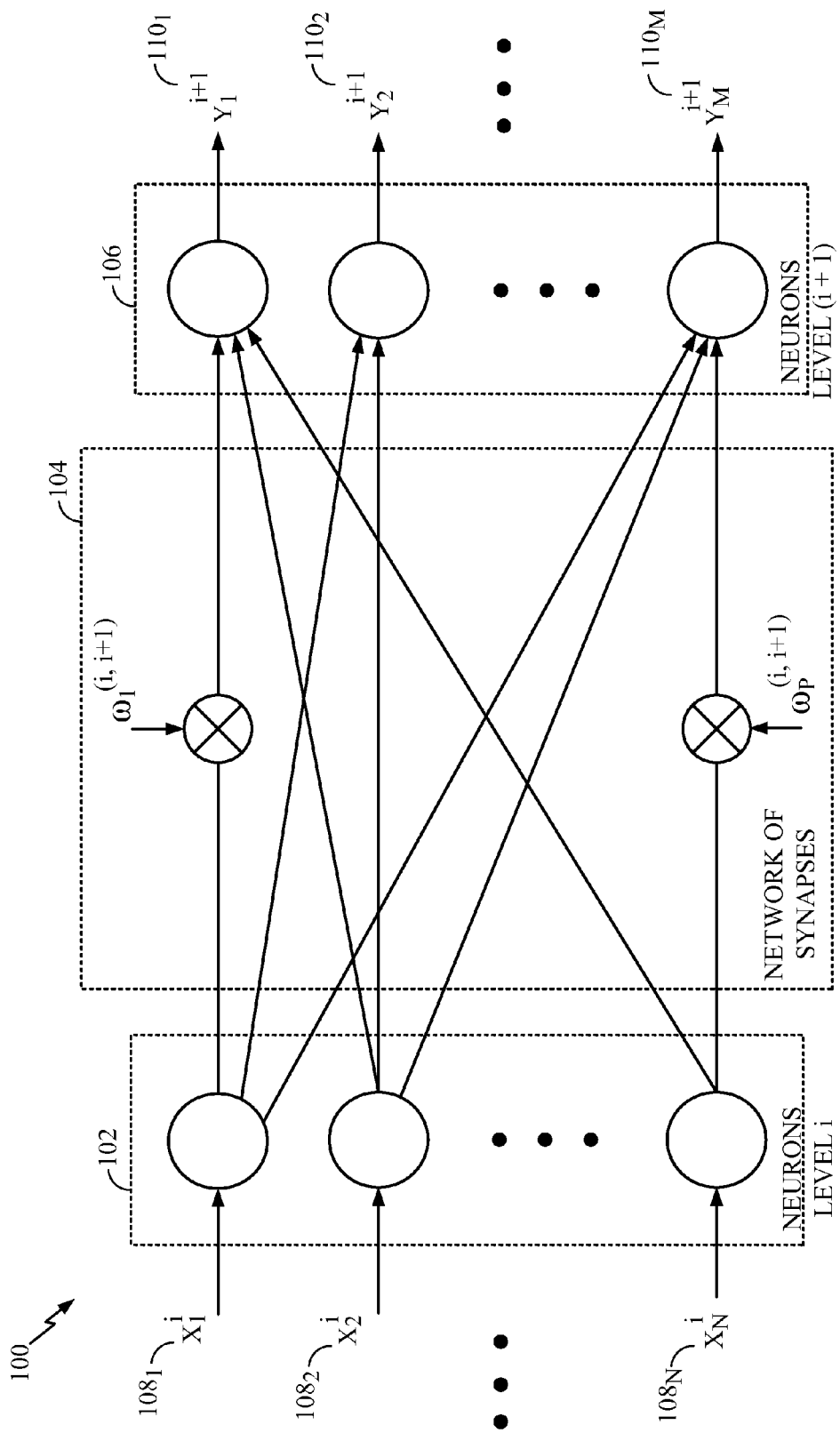
FIG. 1 illustrates an example network of neurons in accordance with certain aspects of the present disclosure.

FIG. 1 illustrates an example artificial neural system 100 with multiple levels of neurons in accordance with certain aspects of the present disclosure. The neural system 100 may have a level of neurons 102 connected to another level of neurons 106 through a network of synaptic connections 104 (i.e., feed-forward connections). For simplicity, only two levels of neurons are illustrated in FIG. 1, although fewer or more levels of neurons may exist in a neural system. It should be noted that some of the neurons may connect to other neurons of the same layer through lateral connections. Furthermore, some of the neurons may connect back to a neuron of a previous layer through feedback connections.

As illustrated in FIG. 1, each neuron in the level 102 may receive an input signal 108 that may be generated by neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106). Such behavior can be emulated or simulated in hardware and/or software, including analog and digital implementations such as those described below.

In biological neurons, the output spike generated when a neuron fires is referred to as an action potential. This electrical signal is a relatively rapid, transient, nerve impulse, having an amplitude of roughly 100 mV and a duration of about 1 ms. In a particular embodiment of a neural system having a series of connected neurons (e.g., the transfer of spikes from one level of neurons to another in FIG. 1), every action potential has basically the same amplitude and duration, and thus, the information in the signal may be represented only by the frequency and number of spikes, or the time of spikes, rather than by the amplitude. The information carried by an action potential may be determined by the spike, the neuron that spiked, and the time of the spike relative to other spike or spikes. The importance of the spike may be determined by a weight applied to a connection between neurons, as explained below.

The transfer of spikes from one level of neurons to another may be achieved through the network of synaptic connections (or simply "synapses") 104, as illustrated in FIG. 1. Relative to the synapses 104, neurons of level 102 may be considered pre-synaptic neurons and neurons of level 106 may be considered post-synaptic neurons. The synapses 104 may receive output signals (i.e., spikes) from the level 102 neurons and scale those signals according to adjustable synaptic weights $w_1^{(i,i+1)}, \ldots, w_P^{(i,i+1)}$ where P is a total number of synaptic connections between the neurons of levels 102 and 106 and is an indicator of the neuron level. For example, in the example of FIG. 1, i represents neuron level 102 and i+1 represents neuron level 106. Further, the scaled signals may be combined as an input signal of each neuron in the level 106. Every neuron in the level 106 may generate output spikes 110 based on the corresponding combined input signal. The output spikes 110 may be transferred to another level of neurons using another network of synaptic connections (not shown in FIG. 1).

Biological synapses may be classified as either electrical or chemical. While electrical synapses are used primarily to send excitatory signals, chemical synapses can mediate either excitatory or inhibitory (hyperpolarizing) actions in postsynaptic neurons and can also serve to amplify neuronal signals. Excitatory signals depolarize the membrane potential (i.e., increase the membrane potential with respect to the resting potential). If enough excitatory signals are received within a certain time period to depolarize the membrane potential above a threshold, an action potential occurs in the postsynaptic neuron. In contrast, inhibitory signals generally hyperpolarize (i.e., lower) the membrane potential. Inhibitory signals, if strong enough, can counteract the sum of excitatory signals and prevent the membrane potential from reaching a threshold. In addition to counteracting synaptic excitation, synaptic inhibition can exert powerful control over spontaneously active neurons. A spontaneously active neuron refers to a neuron that spikes without further input, for example due to its dynamics or a feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the behavior desired.

The neural system 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, where synaptic weight changes may relate to changes of the memristor resistance. With nanometer feature-sized memristors, the area of a neuron circuit and synapses may be substantially reduced, which may make implementation of a large-scale neural system hardware implementation more practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, where a particular functionality may be based on synaptic weights stored in a memory card currently attached to the neural processor.

Figure 2:
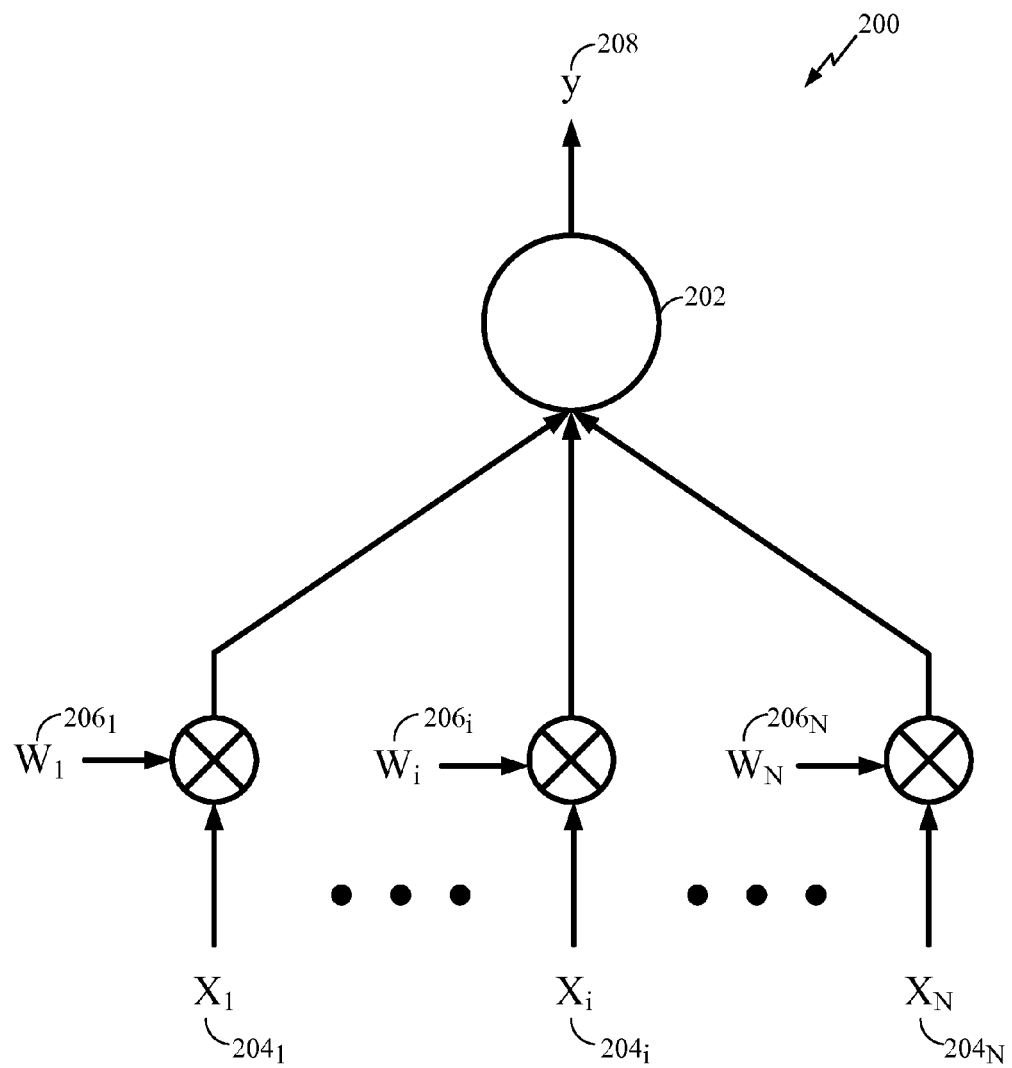
FIG. 2 illustrates an example of a processing unit (neuron) of a computational network (neural system or neural network) in accordance with certain aspects of the present disclosure.

FIG. 2 illustrates an example 200 of a processing unit (e.g., a neuron or neuron circuit) 202 of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$ ($X_1$-$X_N$), which may be signals external to the neural system, or signals generated by other neurons of the same neural system, or both. The input signal may be a current or a voltage, real-valued or complex-valued. The input signal may comprise a numerical value with a fixed-point or a floating-point representation. These input signals may be delivered to the neuron 202 through synaptic connections that scale the signals according to adjustable synaptic weights $206_1$-$206_N$ ($W_1$-$W_N$), where N may be a total number of input connections of the neuron 202.

The neuron 202 may combine the scaled input signals and use the combined scaled inputs to generate an output signal 208 (i.e., a signal Y). The output signal 208 may be a current, or a voltage, real-valued or complex-valued. The output signal may be a numerical value with a fixed-point or a floating-point representation. The output signal 208 may be then transferred as an input signal to other neurons of the same neural system, or as an input signal to the same neuron 202, or as an output of the neural system.

The processing unit (neuron) 202 may be emulated by an electrical circuit, and its input and output connections may be emulated by electrical connections with synaptic circuits. The processing unit 202 and its input and output connections may also be emulated by a software code. The processing unit 202 may also be emulated by an electric circuit, whereas its input and output connections may be emulated by a software code. In an aspect, the processing unit 202 in the computational network may be an analog electrical circuit. In another aspect, the processing unit 202 may be a digital electrical circuit. In yet another aspect, the processing unit 202 may be a mixed-signal electrical circuit with both analog and digital components. The computational network may include processing units in any of the aforementioned forms. The computational network (neural system or neural network) using such processing units may be utilized in a large range of applications, such as image and pattern recognition, machine learning, motor control, and the like.

During the course of training a neural network, synaptic weights (e.g., the weights $w_1^{(i,i+1)}, \ldots, w_P^{(i,i+1)}$ from FIG. 1 and/or the weights $206_1$-$206_N$ from FIG. 2) may be initialized with random values and increased or decreased according to a learning rule. Those skilled in the art will appreciate that examples of the learning rule include, but are not limited to the spike-timing-dependent plasticity (STDP) learning rule, the Hebb rule, the Oja rule, the Bienenstock-Copper-Munro (BCM) rule, etc. In certain aspects, the weights may settle or converge to one of two values (i.e., a bimodal distribution of weights). This effect can be utilized to reduce the number of bits for each synaptic weight, increase the speed of reading and writing from/to a memory storing the synaptic weights, and to reduce power and/or processor consumption of the synaptic memory.

Synapse Type

In hardware and software models of neural networks, the processing of synapse related functions can be based on synaptic type. Synapse types may include non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of multiple types is that processing can be subdivided. For example, non-plastic synapses may not execute plasticity functions (or wait for such functions to complete). Similarly, delay and weight plasticity may be subdivided into operations that may operate together or separately, in sequence or in parallel. Different types of synapses may have different lookup tables or formulas and parameters for each of the different plasticity types that apply. Thus, the methods would access the relevant tables, formulas, or parameters for the synapse's type. Use of varying synapse types may add flexibility and configurability to an artificial neural network.

There are implications of spike-timing dependent structural plasticity being executed independently of synaptic plasticity. Structural plasticity may be executed even if there is no change to weight magnitude (e.g., if the weight has reached a minimum or maximum value, or it is not changed due to some other reason) because structural plasticity (i.e., an amount of delay change) may be a direct function of pre-post spike time difference. Alternatively, structural plasticity may be set as a function of the weight change amount or based on conditions relating to bounds of the weights or weight changes. For example, a synapse delay may change only when a weight change occurs or if weights reach zero but not if they are at a maximum value. However, it may be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as for computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity and homeostatic plasticity.

STDP is a learning process that adjusts the strength of synaptic connections between neurons. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. On the other hand, long-term depression (LTD) may occur if an input spike tends, on average, to occur immediately after an output spike. Then, that particular input is made somewhat weaker, and hence the name "spike-timing-dependent plasticity." Consequently, inputs that might be the cause of the post-synaptic neuron's excitation are made even more likely to contribute in the future, whereas inputs that are not the cause of the post-synaptic spike are made less likely to contribute in the future. The process continues until a subset of the initial set of connections remains, while the influence of all others is reduced to an insignificant level.

Because a neuron generally produces an output spike when many of its inputs occur within a brief period, (i.e., inputs being sufficiently cumulative to cause the output), the subset of inputs that typically remains includes those that tended to be correlated in time. In addition, because the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a pre-synaptic neuron to a post-synaptic neuron as a function of time difference between spike time $t_{pre}$ of the pre-synaptic neuron and spike time $t_{post}$ of the post-synaptic neuron (i.e., $t=t_{post}-t_{pre}$). A typical formulation of the STDP is to increase the synaptic weight (i.e., potentiate the synapse) if the time difference is positive (the pre-synaptic neuron fires before the post-synaptic neuron), and decrease the synaptic weight (i.e., depress the synapse) if the time difference is negative (the post-synaptic neuron fires before the pre-synaptic neuron).

In the STDP process, a change of the synaptic weight over time may be typically achieved using an exponential decay, as given by:

$$\Delta w(t) = \begin{cases} a_+ e^{-t/k_+} + \mu, & t > 0 \\ a_- e^{t/k_-}, & t < 0 \end{cases} \quad (1)$$

where $k_+$ and $k_{-\tau_{sign(\Delta t)}}$ are time constants for positive and negative time difference, respectively, $a_+$ and $a_-$ are corresponding scaling magnitudes, and $\mu$ is an offset that may be applied to the positive time difference and/or the negative time difference.

Figure 3:
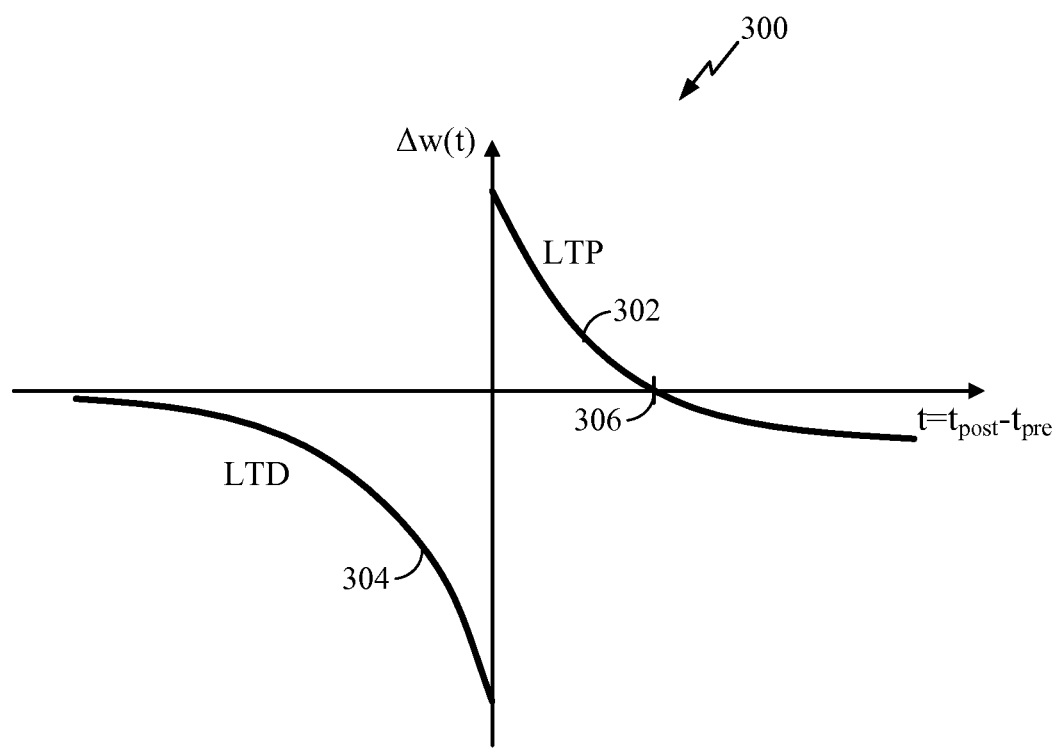
FIG. 3 illustrates an example of spike-timing dependent plasticity (STDP) curve in accordance with certain aspects of the present disclosure.

FIG. 3 illustrates an example graph diagram 300 of a synaptic weight change as a function of relative timing of pre-synaptic and post-synaptic spikes in accordance with the STDP. If a pre-synaptic neuron fires before a post-synaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between pre-synaptic and post-synaptic spike times. The reverse order of firing may reduce the synaptic weight, as illustrated in a portion 304 of the graph 300, causing an LTD of the synapse.

As illustrated in the graph 300 in FIG. 3, a negative offset μ may be applied to the LTP (causal) portion 302 of the STDP graph. A point of cross-over 306 of the x-axis (y=0) may be configured to coincide with the maximum time lag for considering correlation for causal inputs from layer i−1. In the case of a frame-based input (i.e., an input that is in the form of a frame of a particular duration of spikes or pulses), the offset value μ can be computed to reflect the frame boundary. A first input spike (pulse) in the frame may be considered to decay over time either as modeled by a post-synaptic potential directly or in terms of the effect on neural state. If a second input spike (pulse) in the frame is considered correlated or relevant to a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset μ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two elements to allow temporal coding. For example, the arrival time of inputs affects output time and coincidence detection can have a narrow time window. Additionally, to be computationally attractive, a good neuron model may have a closed-form solution in continuous time and stable behavior including near attractors and saddle points. In other words, a useful neuron model is one that is practical and that can be used to model rich, realistic and biologically-consistent behaviors, as well as be used to both engineer and reverse engineer neural circuits.

A neuron model may depend on events, such as an input arrival, output spike or other event whether internal or external. To achieve a rich behavioral repertoire, a state machine that can exhibit complex behaviors may be desired. If the occurrence of an event itself, separate from the input contribution (if any), can influence the state machine and constrain dynamics subsequent to the event, then the future state of the system is not only a function of a state and input, but rather a function of a state, event, and input.

In an aspect, a neuron n may be modeled as a spiking leaky-integrate-and-fire neuron with a membrane voltage $v_n(t)$ governed by the following dynamics:

$$\frac{dv_n(t)}{dt} = \alpha v_n(t) + \beta \sum_m w_{m,n} y_m(t - \Delta t_{m,n}), \quad (2)$$

where $\alpha$ and $\beta$ are parameters, $w_{m,n}$ $w_{m,n}$ a synaptic weight for the synapse connecting a pre-synaptic neuron m to a post-synaptic neuron n, and $y_m(t)$ is the spiking output of the neuron m that may be delayed by dendritic or axonal delay according to $\Delta t_{m,n}$ until arrival at the neuron n's soma.

It should be noted that there is a delay from the time when sufficient input to a post-synaptic neuron is established until the time when the post-synaptic neuron actually fires. In a dynamic spiking neuron model, such as Izhikevich's simple model, a time delay may be incurred if there is a difference between a depolarization threshold $v_t$ and a peak spike voltage $v_{peak}$. For example, in the simple model, neuron soma dynamics can be governed by the pair of differential equations for voltage and recovery, i.e.:

$$\frac{dv}{dt} = (k(v - v_t)(v - v_r) - u + I)/C, \quad (3)$$

$$\frac{du}{dt} = a(b(v - v_r) - u). \quad (4)$$

where v is a membrane potential, u is a membrane recovery variable, k is a parameter that describes time scale of the membrane potential v, a is a parameter that describes time scale of the recovery variable u, b is a parameter that describes sensitivity of the recovery variable u to the sub-threshold fluctuations of the membrane potential v, $v_r$ is a membrane resting potential, I is a synaptic current, and C is a membrane's capacitance. In accordance with this model, the neuron is defined to spike when $v > v_{peak}$.

Hunzinger Cold Model

The Hunzinger Cold neuron model is a minimal dual-regime spiking linear dynamical model that can reproduce a rich variety of neural behaviors. The model's one- or two-dimensional linear dynamics can have two regimes, wherein the time constant (and coupling) can depend on the regime. In the sub-threshold regime, the time constant, negative by convention, represents leaky channel dynamics generally acting to return a cell to rest in a biologically-consistent linear fashion. The time constant in the supra-threshold regime, positive by convention, reflects anti-leaky channel dynamics generally driving a cell to spike while incurring latency in spike-generation.

Figure 4:
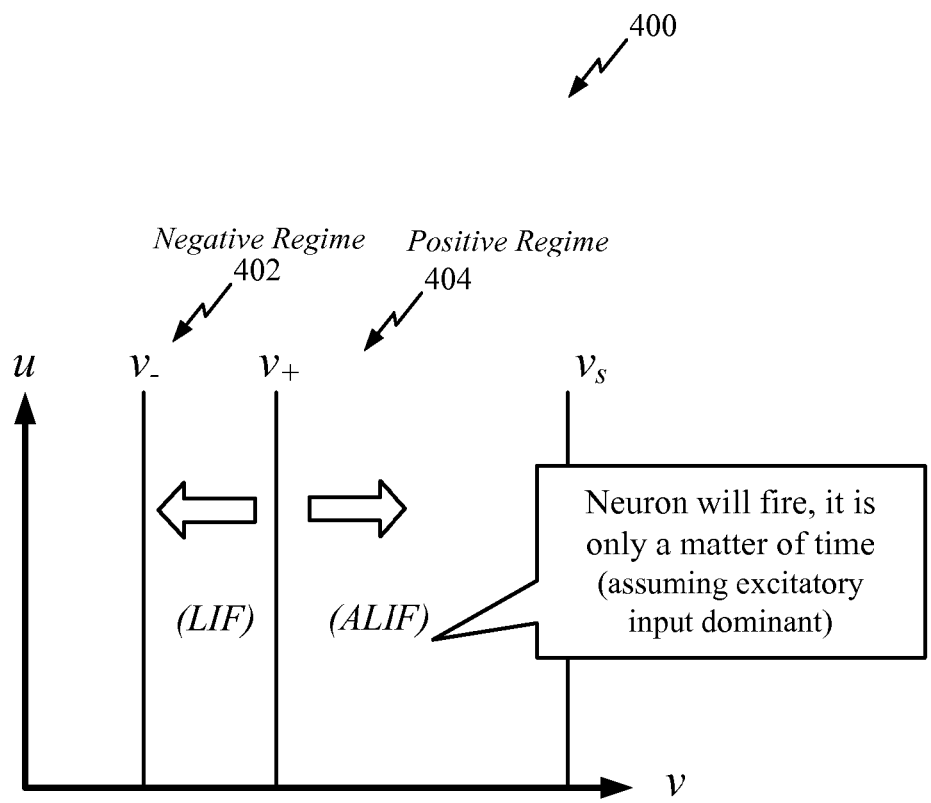
FIG. 4 illustrates an example of a positive regime and a negative regime for defining behavior of a neuron model in accordance with certain aspects of the present disclosure.

As illustrated in FIG. 4, the dynamics of the model may be divided into two (or more) regimes. These regimes may be called the negative regime 402 (also interchangeably referred to as the leaky-integrate-and-fire (LIF) regime (which is different from the LIF neuron model)) and the positive regime 404 (also interchangeably referred to as the anti-leaky-integrate-and-fire (ALIF) regime, not to be confused with the ALIF neuron model)). In the negative regime 402, the state tends toward rest ($v_-$) at the time of a future event. In this negative regime, the model generally exhibits temporal input detection properties and other sub-threshold behavior. In the positive regime 404, the state tends toward a spiking event ($v_s$). In this positive regime, the model exhibits computational properties, such as incurring a latency to spike depending on subsequent input events. Formulation of dynamics in terms of events and separation of the dynamics into these two regimes are fundamental characteristics of the model.

Linear dual-regime bi-dimensional dynamics (for states v and u) may be defined by convention as:

$$\tau_\rho \frac{dv}{dt} = v + q_\rho \quad (5)$$

$$-\tau_u \frac{du}{dt} = u + r \quad (6)$$

where $q_\rho$ and r are the linear transformation variables for coupling.

The symbol $\rho$ is used herein to denote the dynamics regime with the convention to replace the symbol $\rho$ with the sign "−" or "+" for the negative and positive regimes, respectively, when discussing or expressing a relation for a specific regime.

The model state is defined by a membrane potential (voltage) v and recovery current u. In basic form, the regime is essentially determined by the model state. There are subtle, but important aspects of the precise and general definition, but for the moment, consider the model to be in the positive regime 404 if the voltage v is above a threshold ($v_+$) and otherwise in the negative regime 402.

The regime-dependent time constants include $\tau_-$ which is the negative regime time constant, and $\tau_+$ which is the positive regime time constant. The recovery current time constants $\tau_u$ is typically independent of regime. For convenience, the negative regime time constant $\tau_-$ is typically specified as a negative quantity to reflect decay so that the same expression for voltage evolution may be used as for the positive regime in which the exponent and $\tau_+$ will generally be positive, as will be $\tau_u$.

The dynamics of the two state elements may be coupled at events by transformations offsetting the states from their null-clines, where the transformation variables are:

$$q_\rho = -\tau_\rho \beta u - v_\rho \quad (7)$$

$$r = \delta(v + \epsilon) \quad (8)$$

where $\delta$, $\epsilon$, $\beta$ and $v_-$, $v_+$ are parameters. The two values for $v_\rho$ are the base for reference voltages for the two regimes. The parameter $v_-$ is the base voltage for the negative regime, and the membrane potential will generally decay toward $v_-$ in the negative regime. The parameter $v_+$ is the base voltage for the positive regime, and the membrane potential will generally tend away from $v_+$ in the positive regime.

The null-clines for v and u are given by the negative of the transformation variables $q_\rho$ and r, respectively. The parameter $\delta$ is a scale factor controlling the slope of the u null-cline. The parameter $\epsilon$ is typically set equal to $-v_-$. The parameter $\beta$ is a resistance value controlling the slope of the v null-clines in both regimes. The $\tau_\rho$ time-constant parameters control not only the exponential decays, but also the null-cline slopes in each regime separately.

The model may be defined to spike when the voltage v reaches a value $v_s$. Subsequently, the state may be reset at a reset event (which may be one and the same as the spike event):

$$v = \hat{v}_- \quad (9)$$

$$u = u + \Delta u \quad (10)$$

where $\hat{v}_-$ and $\Delta u$ are parameters. The reset voltage $\hat{v}_-$ is typically set to $v_-$.

By a principle of momentary coupling, a closed form solution is possible not only for state (and with a single exponential term), but also for the time required to reach a particular state. The close form state solutions are:

$$v(t + \Delta t) = (v(t) + q_\rho)e^{\frac{\Delta t}{\tau_\rho}} - q_\rho \quad (11)$$

$$u(t + \Delta t) = (u(t) + r)e^{\frac{\Delta t}{\tau_u}} - r \quad (12)$$

Therefore, the model state may be updated only upon events, such as an input (pre-synaptic spike) or output (post-synaptic spike). Operations may also be performed at any particular time (whether or not there is input or output).

Moreover, by the momentary coupling principle, the time of a post-synaptic spike may be anticipated so the time to reach a particular state may be determined in advance without iterative techniques or Numerical Methods (e.g., the Euler numerical method). Given a prior voltage state $v_0$, the time delay until voltage state $v_f$ is reached is given by:

$$\Delta t = \tau_\rho \log \frac{v_f + q_\rho}{v_0 + q_\rho} \quad (13)$$

If a spike is defined as occurring at the time the voltage state v reaches $v_s$, then the closed-form solution for the amount of time, or relative delay, until a spike occurs as measured from the time that the voltage is at a given state v is:

$$\Delta t_S = \begin{cases} \tau_+ \log \frac{v_S + q_+}{v + q_+} & \text{if } v > \hat{v}_+ \\ \infty & \text{otherwise} \end{cases} \quad (14)$$

where $\hat{v}_+$ is typically set to parameter $v_+$, although other variations may be possible.

The above definitions of the model dynamics depend on whether the model is in the positive or negative regime. As mentioned, the coupling and the regime p may be computed upon events. For purposes of state propagation, the regime and coupling (transformation) variables may be defined based on the state at the time of the last (prior) event. For purposes of subsequently anticipating spike output time, the regime and coupling variable may be defined based on the state at the time of the next (current) event.

There are several possible implementations of the Cold model, and executing the simulation, emulation or model in time. This includes, for example, event-update, step-event update, and step-update modes. An event update is an update where states are updated based on events or "event update" (at particular moments). A step update is an update when the model is updated at intervals (e.g., 1 ms). This does not necessarily require iterative methods or Numerical methods. An event-based implementation is also possible at a limited time resolution in a step-based simulator by only updating the model if an event occurs at or between steps or by "step-event" update.

One aspect of the present application is directed to using the Doppler effect to detect frequency variations over time via waves produced by a moving object, such as a police car, or natural phenomena, such as an earthquake. The Doppler effect is the change in frequency of a wave (or other periodic event) from its source. It is commonly heard when a vehicle sounding a siren or horn approaches, passes, and recedes from an observer. The received frequency is higher (compared to the emitted frequency) during the approach, it is identical at the instant of passing by, and it is lower during the recession. That is, an increase in frequency over time indicates that the object is approaching the observer. Likewise, a decrease in frequency over time indicates that the object is receding from the observer.

The relative changes in frequency can be explained as follows. When the source of the waves is moving toward the observer, each successive wave crest is emitted from a position closer to the observer than the previous wave. Therefore, each wave has less time to reach the observer than the previous wave. Accordingly, the time between the arrival of successive wave crests at the observer is reduced, causing an increase in the frequency. Conversely, if the source of waves is moving away from the observer, each wave is emitted from a position farther from the observer than the previous wave, so the arrival time between successive waves is increased, reducing the frequency.

For waves that propagate in a medium, such as sound waves, the velocities of the observer and of the source are relative to the medium in which the waves are transmitted. The total Doppler effect may result from the motion of the source, motion of the observer, or motion of the medium. Each of these effects is analyzed separately. For waves that do not require a medium, such as light or gravity in general relativity, only the relative difference in velocity between the observer and the source are considered.

According to an aspect of the present disclosure, a neuromorphic receiver is specified to calculate a speed and/or velocity of an object based on an increase or decrease in frequency over time. In this configuration, the neuromorphic receiver may be modeled based on the human auditory system. More specifically, the neuromorphic receiver has spiking neurons mapped to different frequencies in a logarithmic tonotopic map. The tonotopic map refers to a mapping of spatial attributes to frequencies. In one configuration, a nonlinear one-dimensional tonotopic map is specified to map increasing or decreasing frequencies.

That is, a tonotopic map based detector may be used to detect the frequency variations to determine the object's speed, velocity, and/or location. Of course, the tonotopic map is not limited to speed, velocity, and/or location, as other attributes may also be determined via the tonotopic map.

Figure 5:
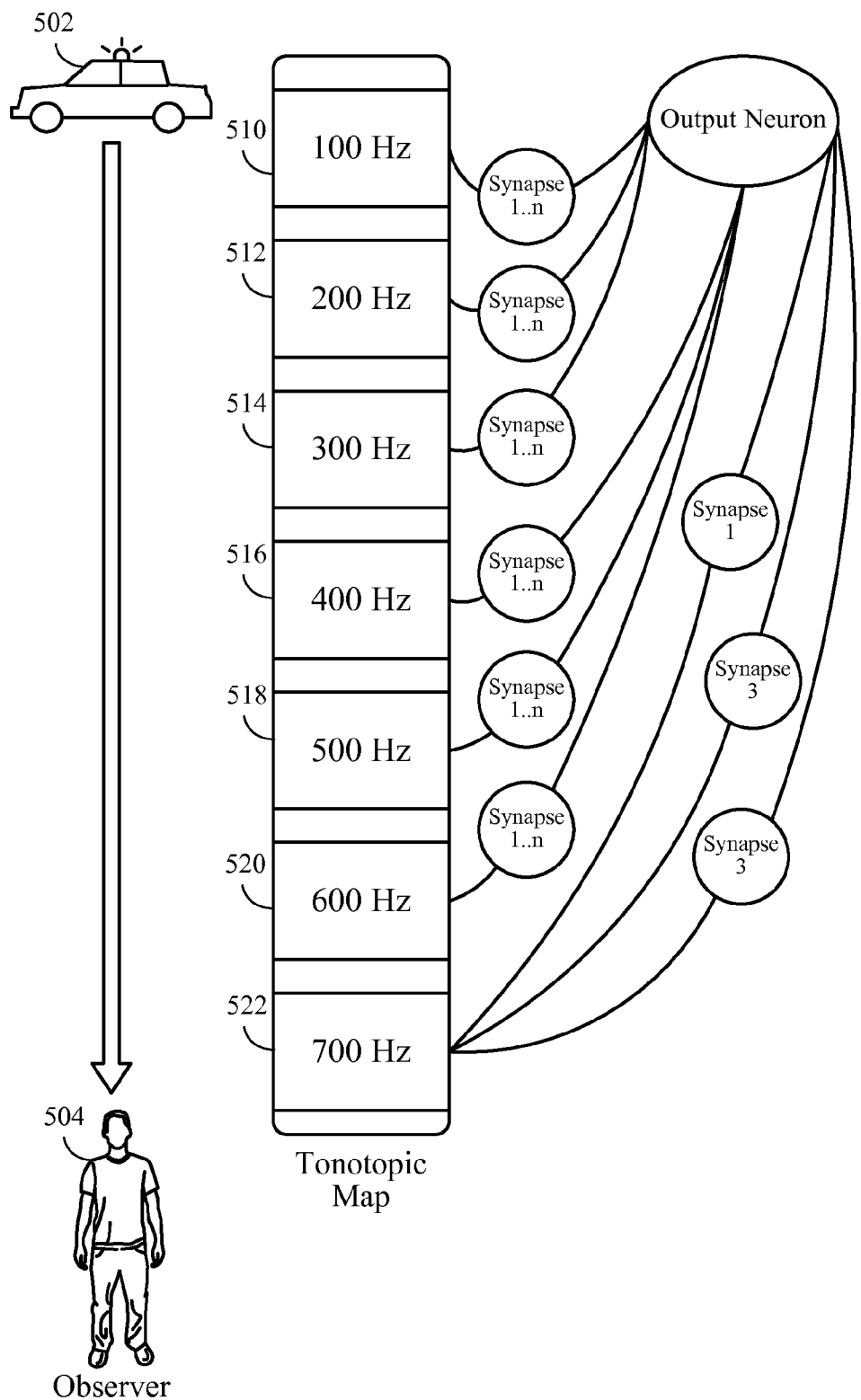
FIG. 5 illustrates an example of a tonotopic map according to an aspect of the present disclosure.

FIG. 5 illustrates a tonotopic map with frequencies mapped in ascending order (100 Hz-700 Hz). FIG. 5 illustrates an object 502 moving towards an observer 504. The tonotopic map of FIG. 5 is also contemplated for an object receding from the observer. Each frequency, such as 100 Hz, of the tonotopic map may be referred to as a bin or a frequency bin 510-522. The frequency of each bin and the granularity of the bins is application specific and is not limited to the mapping of FIG. 5. Each frequency bin 510-522 may be associated with a spiking neuron (not shown). The spiking neuron associated with a frequency bin is triggered (e.g., spikes) when a value of the specific frequency is equal to or greater than a threshold. The value may be the energy of the frequency, an amplitude, or other value. The spiking neuron may be referred to as a one-bit quantizer.

The spiking neurons associated with each frequency bin may fire at different times when an object is approaching or receding from the user (e.g., the observer 504). That is, when an object is approaching/receding at a first time instance, a first set of spiking neurons associated with one or more frequency bins is triggered. Furthermore, as the object is further approaching/receding, at a second time instance, a second set of spiking neurons associated with one or more frequency bins is triggered. Other spiking neurons are triggered until movement of the object is no longer detected. The output neuron is fired based on the sum of the spikes of the spiking neurons.

As discussed above, each bin is connected to a spiking neuron. Furthermore, each spiking neuron (not shown) of a frequency bin has a one-to-one connection with one or more output neurons via one or more synapses (1-n). Those skilled in the art will appreciate that although FIG. 5 illustrates one output neuron, however, the aspects of the present disclosure are contemplated for more than one output neuron.

In one aspect, each synapse is given a weight and a delay. The weights and delays of each synapse may be different and may be randomly set. The delay refers to a time delay added to a time when a spiking neuron spikes. The weight refers to a scale applied to a signal transmitted via the synapse.

In one configuration, as shown in FIG. 5 each spiking neuron is connected to each output neuron via more than one synapse (1-n). The spiking neurons connected to synapses 1-n may be referred to as layer one neurons and the output neurons may be referred to as layer two neurons.

Figure 6:
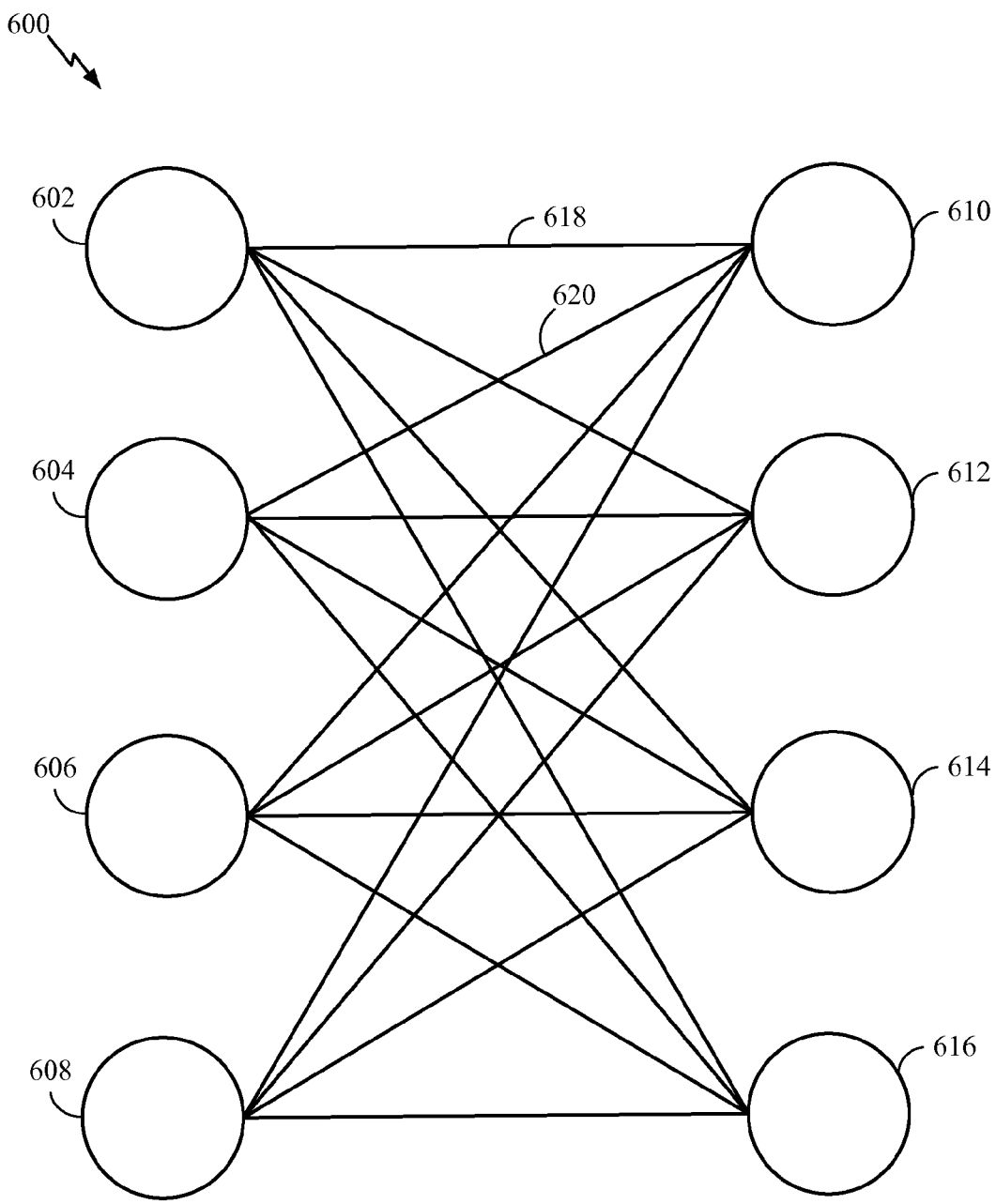
FIGS. 6-8 illustrate example of spiking neurons and output neurons according to aspects of the present disclosure.

FIG. 6 illustrates a neural network 600 including a set of spiking neurons 602-608 with all-to-all connections with a set of output neurons 610-616. Each spiking neuron is connected to an output neuron via a synapse. For example, a first spiking neuron 602 is connected to a first output neuron 610 via a synapse 618. Each synapse is given a different weight and a different delay. As previously discussed, each spiking neuron may be connected to each output neuron via more than one synapse.

As previously discussed, a signal may be detected at a specific time and the signal may be mapped to various frequencies in the tonotopic map. The spiking neurons associated with each frequency been may be triggered when a value of the frequency bin exceeds a threshold. The spiking of the spiking neurons may trigger one or more output neurons to spike.

In one configuration, the output neuron is based on only one spike from a spiking neuron. In another configuration, a summation of spikes from two or more spiking neurons triggers the output neuron to spike.

Specifically, the output neuron is triggered based on the weight of each spike and the time between two or more spikes. As shown in FIG. 6, a first spiking neuron 602 is connected to a first output neuron 610 via a first synapse 618. Additionally, a second spiking neuron 604 is connected to the first output neuron 610 via a second synapse 620.

In one example, the first output neuron 610 may be set to trigger when the spikes have a weight equal to or greater than four and are at most two milliseconds (ms) apart from each other. In a first example, the first synapse 618 may have a delay of 3 ms and a weight of five and the second synapse 620 may have a delay of 4 ms and a weight of six. In this example, when the first spiking neuron 602 is triggered, the first output neuron 610 receives the spike at a weight of five with a 3 ms delay. Moreover, when second spiking neuron 604 is triggered, the first output neuron 610 receives the spike at a weight of six with a 4 ms delay. In this example, the spikes from the first spiking neuron 602 and second spiking neuron 604 are received within 1 ms of each other and the weight of each spike is greater than four. Therefore, in this example, the first output neuron 610 is triggered based on the spikes of the first spiking neuron 602 and second spiking neuron 604.

In a second example, the first synapse 618 may have a delay of 3 ms and a weight of five and the second synapse 620 may have a delay of 6 ms and a weight of four. In this example, when the first spiking neuron 602 is triggered, the first output neuron 610 receives the spike at a weight of five with a 3 ms delay. Moreover, when the second spiking neuron 604 is triggered, the first output neuron 610 receives the spike at a weight of four with a 6 ms delay. In this example, the spikes from the first spiking neuron 602 and second spiking neuron 604 are received within 3 ms of each other and the weight of each spike is greater than or equal to four. Therefore, in this example, the first output neuron 610 is not triggered because the time between the two spikes from the first spiking neuron 602 and second spiking neuron 604 is greater than the 2 ms threshold.

FIG. 6 illustrates four output neurons, however, those skilled in the art will appreciate the number of output neurons is not limited to the number of output neurons shown in FIG. 6. The number of output neurons is dependent on the number of speeds and/or directions that are desired to be distinguished. More specifically, each output neuron is trained to respond to one combination of speed and direction. Furthermore, in one configuration, the spiking neurons 602-608 may be associated with one frequency bin. Moreover, FIG. 6 only shows four spiking neurons, the number of spiking neurons is dependent on the number of frequency bins in a tonotopic map.

Based on the training of the neural network model, the firing of an output neuron indicates whether the object is approaching or receding from the observer and/or a relative speed of the object. The model is trained by simulating the approach of an object towards the observer. Furthermore, the model is also trained by simulating an object that recedes from the observer. The model may also be trained based on an object moving at different speeds (approaching or receding) by varying the rate at which the frequency of the signal changes. The training phase may strengthen some synapses while attenuating other synapses.

Objects may approach and/or recede at various speeds. To train the system, for each speed, the model determines the specific frequencies and synapses that are triggered as the object approaches and/or recedes. More specifically, in one example, in a training mode, an object may approach the observer at 30 MPH. During the training, specific frequencies and synapses are triggered and the model may store the results of the training. Accordingly, after training the model, when another object approaches the observer at 30 MPH, the model may determine an object's relative speed based on the results of the training. That is, based on the output neuron that is triggered, the model may determine the relative speed of the object.

Figure 7:
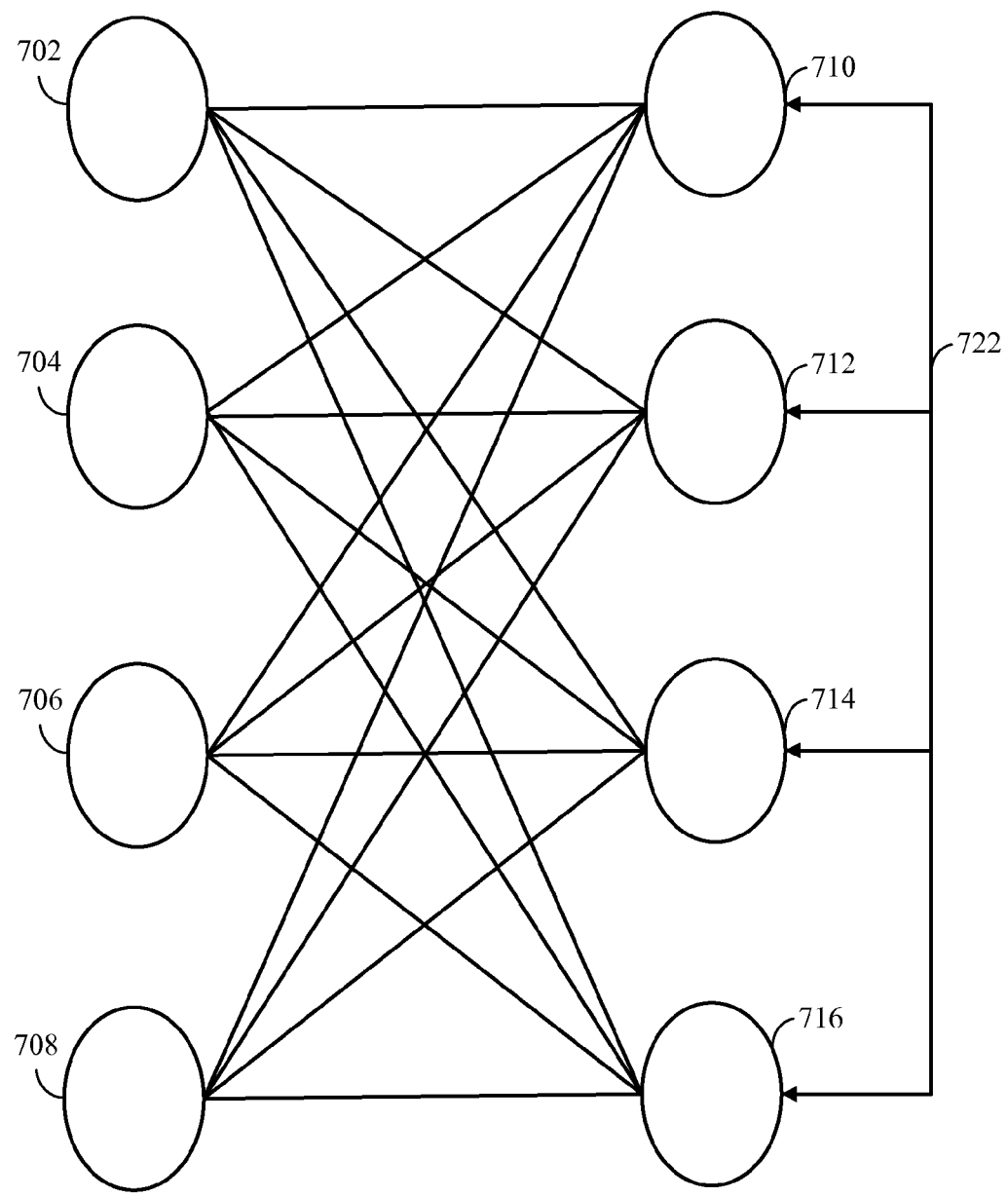

FIG. 7 illustrates a neural model based on an aspect of the present disclosure. As previously discussed, in one example, during training, an object may approach the observer at 30 MPH. In this example, the first spiking neuron 702, second spiking neuron 704, and fourth spiking neuron 708 may spike when an object approaches the observer at 30 MPH. Because the delays and weights of the synapses connecting the spiking neurons 702-708 to the output neurons 710-716 are random, one or more of the output neurons 710-716 may be triggered. That is, the random combination of weights and delays of the synapses will cause one or more output neurons 710-716 to be triggered while other output neurons 710-716 may not be triggered. As an example, based on the spiking of the first spiking neuron 702, second spiking neuron 704, and fourth spiking neuron 708, the first output neuron 710 and the second output neuron 712 may be triggered.

Still, to prevent an overlap of output neurons firing at different speeds, the model may be configured to inhibit the firing of multiple output neurons so that only one output neuron is triggered at specific speed/direction, such as approaching at 30 MPH. This may provide a unique or dominant output neuron for each speed/direction of the system. Thus, in one configuration, lateral inhibition may be specified to determine a unique output neuron for a given speed.

As shown in FIG. 7, a lateral inhibition connection 722 may be specified between each output neuron 710-716. In the present configuration, because the synapses have a random combination of weights and delays, one of the output neurons 710-716 are triggered before the other output neurons 710-716. Thus, when a specific output neuron is the first to be fired, the specific output neuron inhibits the other output neurons via the lateral inhibition connection. The inhibition may prevent the other output neurons from firing even if they received a spike via a synapse. Alternatively, the inhibition may not stop the inhibited output neuron from firing, rather, the inhibition may delay or weaken the firing of the inhibited output neuron.

Based on the example discussed above, the spiking of the first spiking neuron 702, second spiking neuron 704, and fourth spiking neuron 708, may trigger the first output neuron 710 and the second output neuron 712 to fire. Still, when lateral inhabitation is specified, the output neuron that is the first to be triggered will inhibit the other output neuron(s). Thus, in this example, if the first output neuron 710 is fired before the second output neuron 712, then the first output neuron 710 will inhibit the firing of the second output neuron 712 via the lateral inhibition connection 722, and vice versa.

It should be noted that the output neuron that is the first to be triggered may not fully inhibit the other output neurons from firing at the first pass of training. Rather, in some configurations, multiple training passes may be specified until the other output neurons are fully inhibited from firing.

Furthermore, in one configuration, weight plasticity is specified to adjust a weight of specific synapses after each training run. Specifically, a weight of a synapse may be increased when the timing of a spike for a spiking neuron is within a specific timeframe to the timing of the output neuron firing. The strength of the spike on the synapse is increased as a result of the increase in the weight. In general, the weight may be increased or decreased. The increase or decrease may be determined based on the order of the spike. A standard spike timing dependent plasticity (STDP) implementation may decrease weights if the post-neuron fired before the pre-neuron and increase if the post-neuron fired after the pre-neuron. In the present configuration, for the feedforward path, the first layer of spiking neurons are the pre-neurons and the output layer includes the post-neurons.

Figure 8:
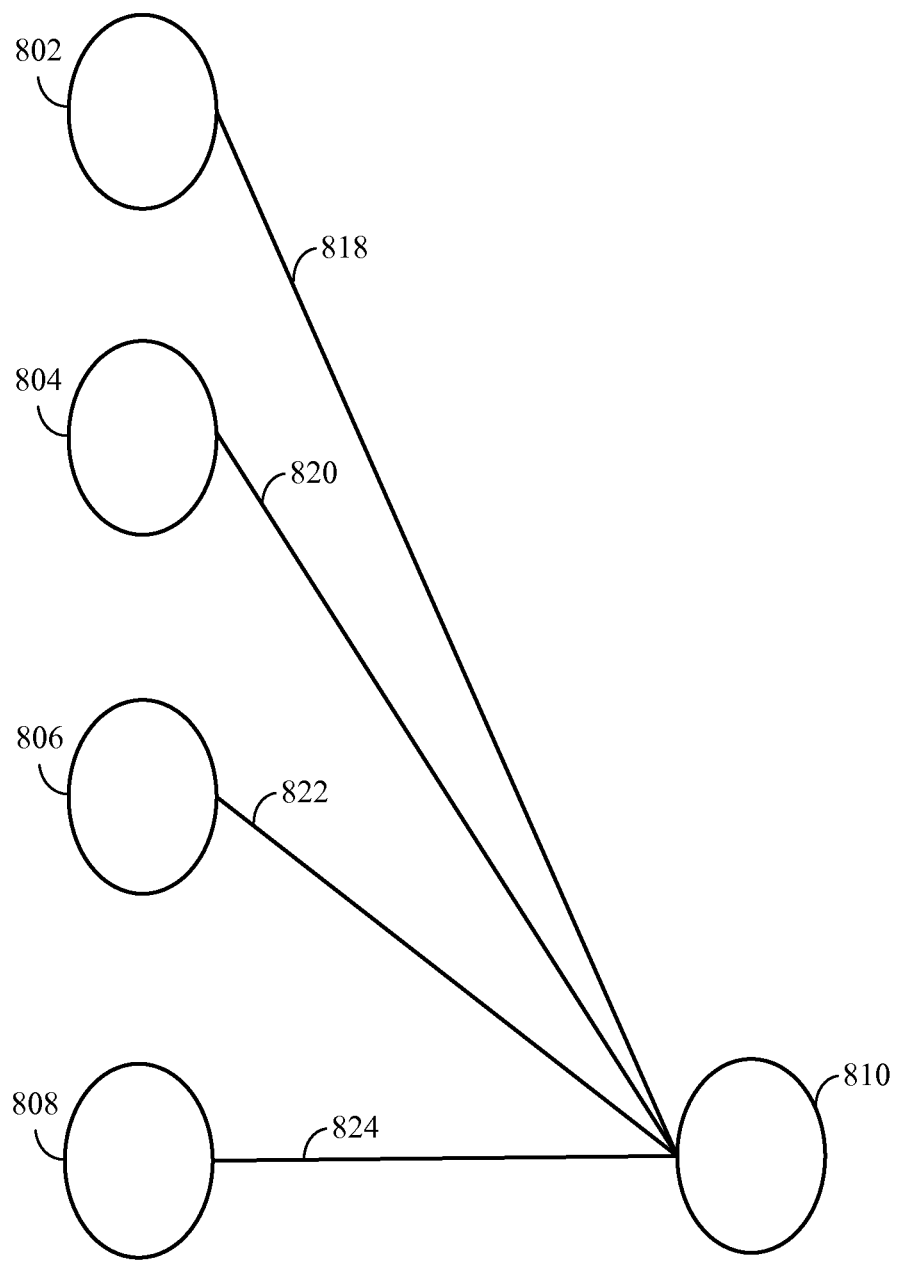

FIG. 8 illustrates an example of adjusting the weight of synapses based on an aspect of the present disclosure. As shown in FIG. 8, an output neuron 810 may be connected to spiking neurons 802-808 via synapses 818-824. Each synapse may have a specific weight and a specific delay. In one example, the output neuron 810 may receive spikes from the first spiking neuron 802, the third spiking neuron 806, and the fourth spiking neuron 808.

After receiving the spikes, the output neuron 810 determines the difference between the time each spiking neuron spiked and the time the output neuron spiked. In this example, the output neuron 810 spikes at time (t), the first spiking neuron 802 spikes at time (t−2), the third spiking neuron 806 spikes at time (t−5), and the fourth spiking neuron 808 spikes at time (t−1). The output neuron adjusts the weight of each synapse based on the time difference between the firing of the output neuron (t) and the spiking of the spiking neuron (e.g., t−x). In one configuration, the weight is adjusted based on a weight plasticity graph based on the time difference between the firing of the output neuron and the spiking of the spiking neuron. The increase or decrease of weights and the magnitude of the increase or decrease may be dependent on the STDP curve.

In another configuration, delay plasticity may also be applied to the synapses. The delay plasticity may be implemented similar to the weight plasticity. Delay plasticity refers to adjusting the delay of a specific synapse based on the difference between the time each spiking neuron spiked and the time the output neuron spiked. The delay plasticity and/or weight plasticity may be specified in combination with, or separate from, the lateral inhibition.

After a specific number of training runs, the neural model may inhibit the firing of output neurons that are not the first to spike. The inhibition may be based on lateral inhibition of output neurons, weight plasticity, delay plasticity, or a combination thereof. The lateral inhibition, weight plasticity, and delay plasticity specify that a unique output neuron is fired for each trained speed. That is, because the weights and delays are random, different output neurons fire based on different speed/direction patterns.

In one configuration, after completing a training set, the specific output neuron for the specific speed may be labeled. Moreover, after performing training sets for various speeds and/or directions, the system may determine each output neuron associated with each speed/direction. Thus, when the system is deployed after completing the training sets, the system may indicate the speed/direction of an object based on the specific output neuron that fired.

The application of the Doppler effect for object location may also be combined with other techniques that use stereo phase and amplitude differences to detect an object's location.

Aspects of the present disclosure have been described referencing an object approaching a user. Still, it should be noted that the aspects of the present disclosure are not limited to frequencies emitted from an object and are also contemplated for frequencies emitted due to natural phenomenon.

Figure 9:
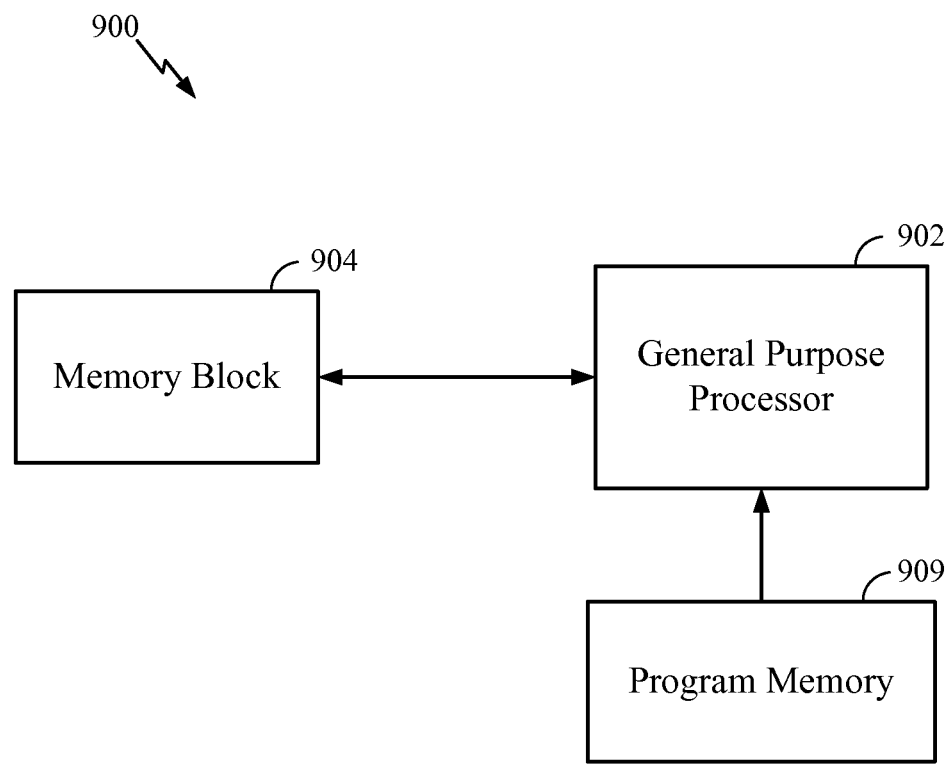
FIG. 9 illustrates an example implementation of designing a neural network using a general-purpose processor in accordance with certain aspects of the present disclosure.

FIG. 9 illustrates an example implementation 900 of the aforementioned method for determining a speed and/or direction of an object using a general-purpose processor 902 in accordance with certain aspects of the present disclosure. Variables (neural signals), synaptic weights, system parameters associated with a computational network (neural network), delays, and frequency bin information may be stored in a memory block 904, while instructions executed at the general-purpose processor 902 may be loaded from a program memory 909. In an aspect of the present disclosure, the instructions loaded into the general-purpose processor 902 may comprise code for determining a speed and/or direction of an object.

Figure 10:
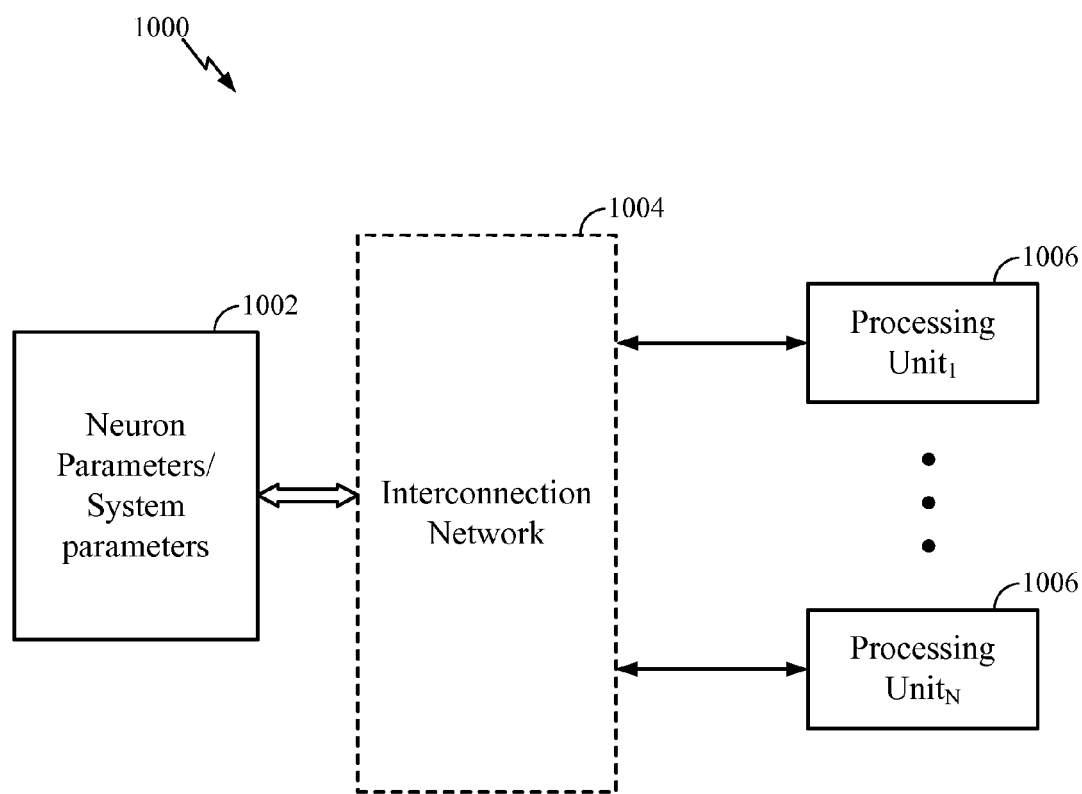
FIG. 10 illustrates an example implementation of designing a neural network where a memory may be interfaced with individual distributed processing units in accordance with certain aspects of the present disclosure.

FIG. 10 illustrates an example implementation 1000 of the aforementioned method for determining a speed and/or direction of an object where a memory 1002 can be interfaced via an interconnection network 1004 with individual (distributed) processing units (neural processors) 1006 of a computational network (neural network) in accordance with certain aspects of the present disclosure. Variables (neural signals), synaptic weights, system parameters associated with the computational network (neural network) delays, and frequency bin information may be stored in the memory 1002, and may be loaded from the memory 1002 via connection(s) of the interconnection network 1004 into each processing unit (neural processor) 1006. In an aspect of the present disclosure, the processing unit 1006 may be configured to determine a speed and/or direction of an object.

Figure 11:
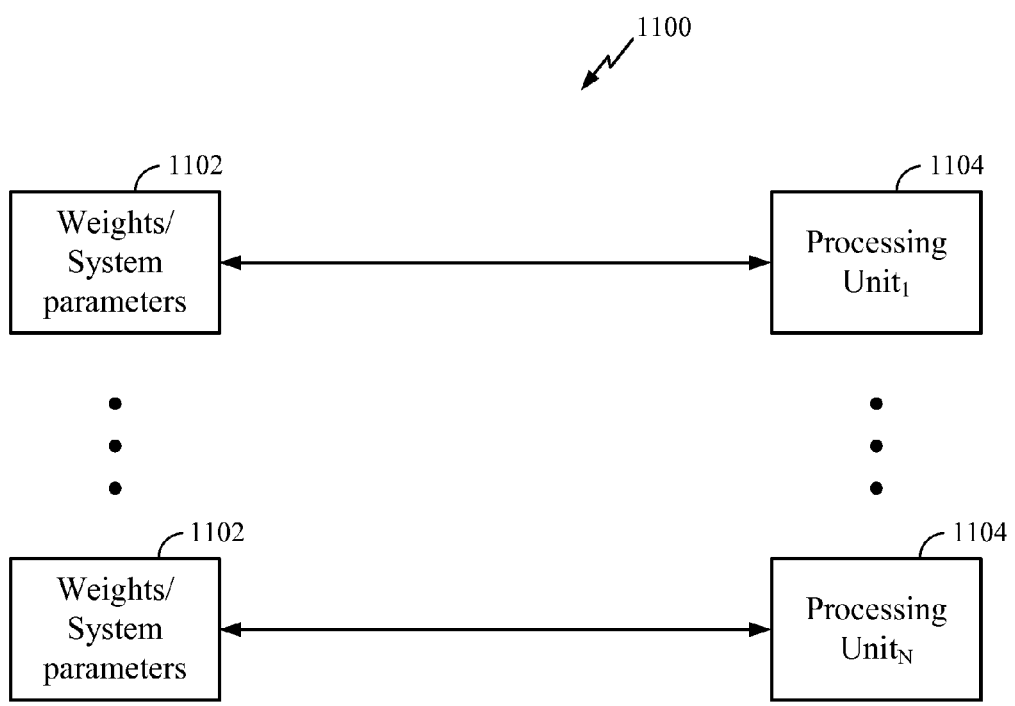
FIG. 11 illustrates an example implementation of designing a neural network based on distributed memories and distributed processing units in accordance with certain aspects of the present disclosure.

FIG. 11 illustrates an example implementation 1100 of the aforementioned method for determining a speed and/or direction of an object. As illustrated in FIG. 11, one memory bank 1102 may be directly interfaced with one processing unit 1104 of a computational network (neural network). Each memory bank 1102 may store variables (neural signals), synaptic weights, system parameters associated with a corresponding processing unit (neural processor) 1104 delays, and frequency bin information. In an aspect of the present disclosure, the processing unit 1104 may be configured to determine a speed and/or direction of an object.

Figure 12:
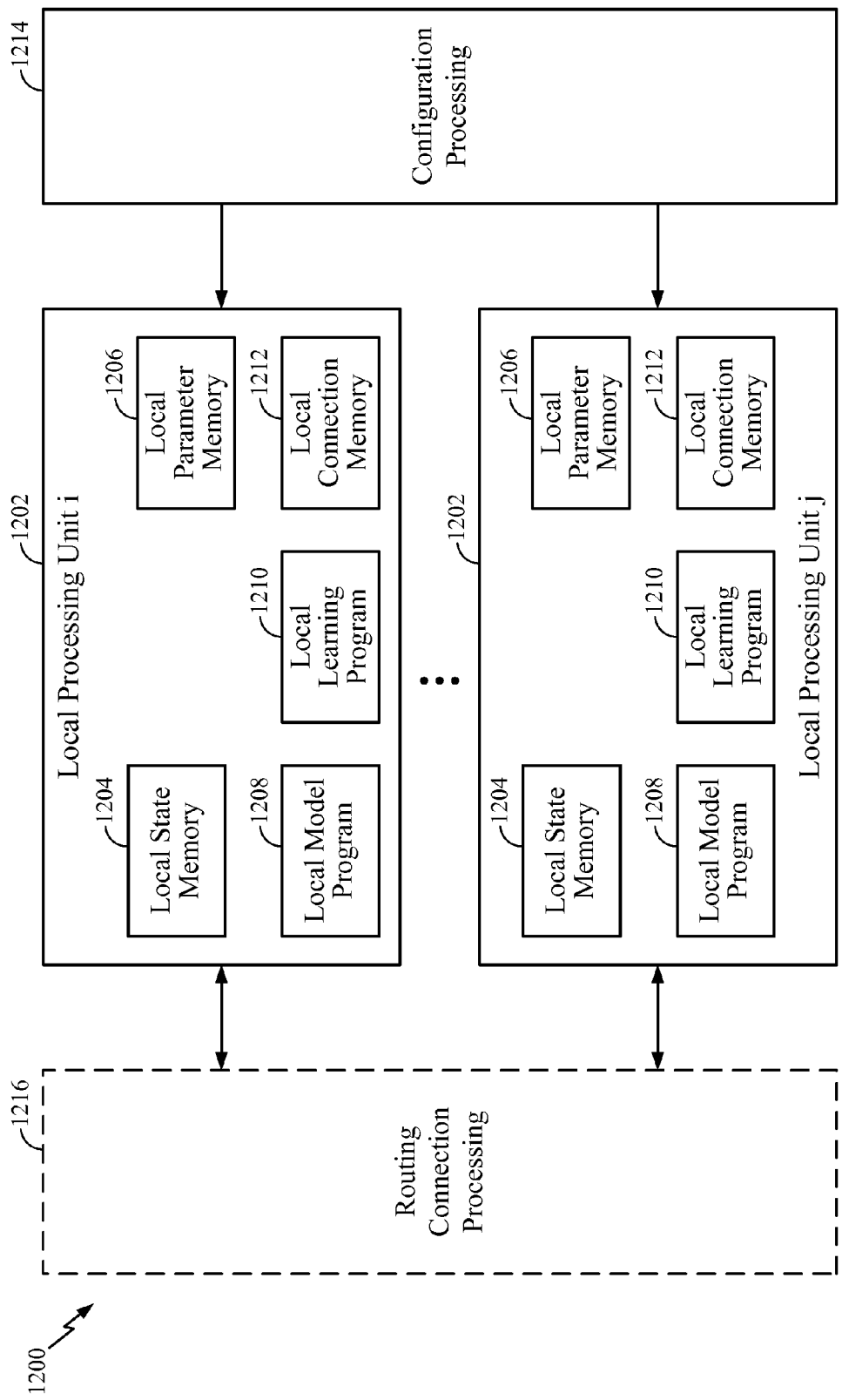
FIG. 12 illustrates an example implementation of a neural network in accordance with certain aspects of the present disclosure.

FIG. 12 illustrates an example implementation of a neural network 1200 in accordance with certain aspects of the present disclosure. As illustrated in FIG. 12, the neural network 1200 may have multiple local processing units 1202 that may perform various operations of methods described above. Each local processing unit 1202 may comprise a local state memory 1204 and a local parameter memory 1206 that store parameters of the neural network. In addition, the local processing unit 1202 may have a memory 1208 with local (neuron) model program, a memory 1210 with local learning program, and a local connection memory 1212. Furthermore, as illustrated in FIG. 12, each local processing unit 1202 may be interfaced with a unit 1214 for configuration processing that may provide configuration for local memories of the local processing unit, and with routing connection processing elements 1216 that provide routing between the local processing units 1202.

In one configuration, a neural network, such as the neural network 600, is configured for frequency discrimination associated with the Doppler effect including means for mapping and means for firing. In one aspect, the mapping means and/or firing means may be the general-purpose processor 902, program memory 909, memory block 904, memory 1002, interconnection network 1004, processing units 1006, processing unit 1104, local processing units 1202, and or the routing connection processing elements 1216 configured to perform the functions recited by the mapping and/or firing means. In another configuration, the aforementioned means may be any module or any apparatus configured to perform the functions recited by the aforementioned means.

Figure 13:
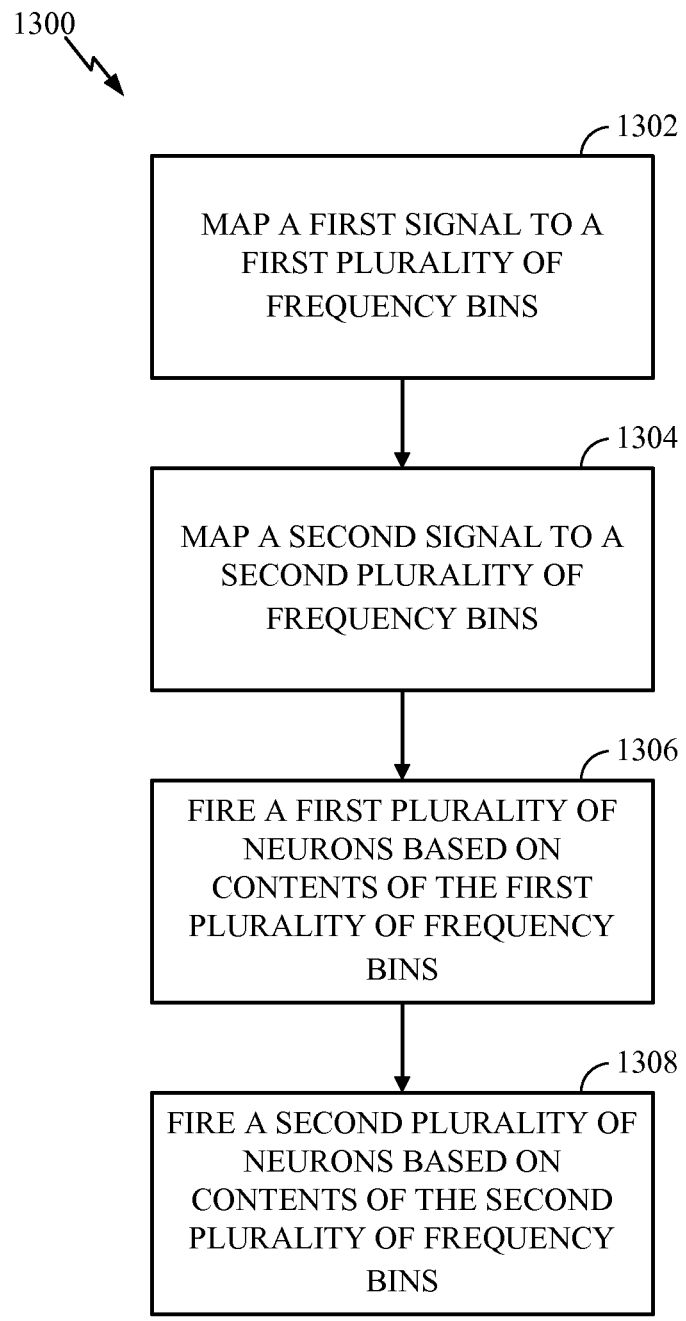
FIG. 13 is a block diagram illustrating a method for processing a Doppler effect according to an aspect of the present disclosure.

FIG. 13 illustrates a method 1300 for frequency discrimination associated with a Doppler effect. In block 1302, a neural network maps a first signal to a first plurality of frequency bins. In one configuration, the first signal corresponds to a first time. The neural network maps a second signal to a second plurality of frequency bins in block 1304. In the present configuration, the second signal corresponds to a second time. In block 1306, the neural network fires a first plurality of neurons based on contents of the first plurality of frequency bins. The first plurality of neurons correspond to the first plurality of frequency bins. Additionally, in block 1308, the neural network fires a second plurality of neurons based on contents of the second plurality of frequency bins. The second plurality of neurons correspond to the second plurality of frequency bins. In one configuration, the first plurality of neurons and the second plurality of neurons correspond to a first layer of neurons of a spiking network. Additionally, the firing of the first plurality of neurons and the second plurality of neurons may be based on a relative speed of an object.

Figure 14:
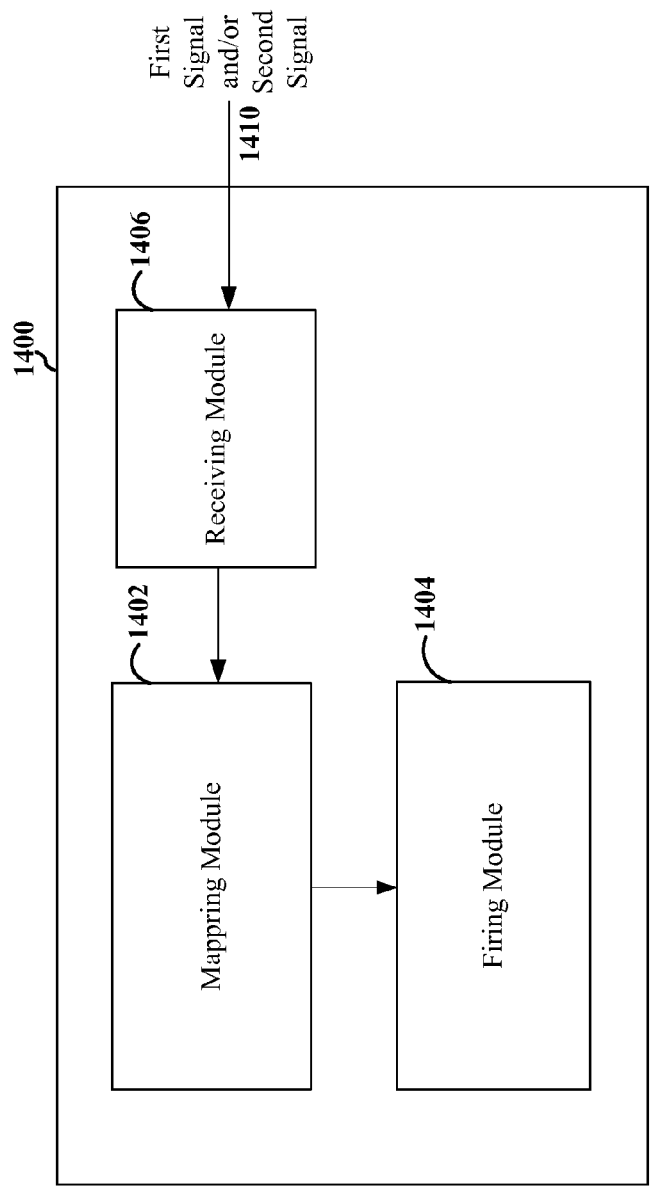
FIG. 14 is a conceptual data flow diagram illustrating the data flow between different modules/means/components in an exemplary apparatus.

FIG. 14 is a conceptual data flow diagram illustrating the data flow between different modules/means/components in an exemplary neural network 1400. The neural network 1400 includes a mapping module 1402 that maps a first signal to a first plurality of frequency bins. The mapping module 1402 may also map a second signal to a second plurality of frequency bins. The neural network 1400 also includes a firing module 1404 that fires a first plurality of neurons based on contents of the first plurality of frequency bins. The firing module 1404 may also fire a second plurality of neurons based on contents of the second plurality of frequency bins. The neural network 1400 may further include a receiving module 1406 that receives a signal 1410 transmitted from a moving object and/or natural phenomenon. The signal may be the first signal and/or second signal. The apparatus may include additional modules that perform each of the steps of the process in the aforementioned flow chart of FIG. 13. As such, each step in the aforementioned flow chart FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

According to certain aspects of the present disclosure, each local processing unit 1202 may be configured to determine parameters of the neural network based upon desired one or more functional features of the neural network, and develop the one or more functional features towards the desired functional features as the determined parameters are further adapted, tuned and updated.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC (Application Specific Integrated Circuit) with the processor, the bus interface, the user interface, supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of frequency discrimination associated with a Doppler effect, comprising:
    mapping a first frequency of a first audio signal to a first set of frequency bins of a plurality of frequency bins, each frequency bin of the plurality of frequency bins corresponding to a different frequency, and the first audio signal emitted from a moving object at a first time;
    mapping a second frequency of a second audio signal to a second set of the plurality of frequency bins, the second audio signal emitted from the moving object at a second time;
    firing a first plurality of neurons based at least in part on the first frequency mapped to the first set of frequency bins, each one of the first plurality of neurons corresponding to a frequency bin of the first set of frequency bins;
    firing a second plurality of neurons based at least in part on the second frequency mapped to the second set of frequency bins, each one of the second plurality of neurons corresponding to a frequency bin of the second set of frequency bins, the first plurality of neurons and the second plurality of neurons corresponding to a first layer of neurons of a network, and the firing of the first plurality of neurons and the second plurality of neurons based at least in part on a relative speed of the moving object towards or away from a receiver of the first audio signal and the second audio signal; and
    estimating the relative speed of the moving object based on a firing pattern of the first plurality of neurons and the second plurality of neurons and a time difference between firing the first plurality of neurons and the second plurality of neurons.

2. The method of claim 1, further comprising:
    receiving, at a first plurality of neurons of a second layer, output from the first plurality of neurons of the first layer via a first plurality of synapses, and
    receiving, at the first plurality of neurons of the second layer, output from the second plurality of neurons of the first layer via a second plurality of synapses, each synapse of the first plurality of synapses and the second plurality of synapses comprising a weight and a delay; and
    firing at least one of the first plurality of neurons of the second layer based on an accumulated output from the first plurality of neurons of the first layer and the second plurality of neurons of the first layer.

3. The method of claim 2, further comprising adjusting the weight and/or the delay of a synapse based at least in part on a difference in time between firing of the at least one of the first plurality of neurons of the second layer and the at least one of the first plurality of neurons or the second plurality of neurons of the first layer.

4. The method of claim 3, further comprising labeling a dominant neuron in the second layer for a specific relative speed.

5. The method of claim 2, further comprising receiving at a first neuron of the second layer an output from a second neuron of the second layer, in which the output is received via an inhibitory synapse.

6. The method of claim 1, in which each frequency bin of the first set of frequency bins and the second set of frequency bins is nonlinearly mapped to a corresponding frequency.

7. The method of claim 6, in which the mapping is based at least in part on a logarithmic mapping.

8. The method of claim 1, in which each frequency bin of the first set of frequency bins or the second set of frequency bins is nonlinearly mapped to a corresponding frequency.

9. An apparatus for frequency discrimination associated with a Doppler effect, comprising:
    a memory; and at least one processor coupled to the memory, the at least one processor being configured:

to map a first frequency of a first audio signal to a first set of frequency bins of a plurality of frequency bins, each frequency bin of the plurality of frequency bins corresponding to a different frequency, and the first audio signal emitted from a moving object at a first time;

to map a second frequency of a second audio signal to a second set of the plurality of frequency bins, the second audio signal corresponding to the moving object at a second time;

to fire a first plurality of neurons based at least in part on the first frequency mapped to the first set of frequency bins, each one of the first plurality of neurons corresponding to a frequency bin of the first set of frequency bins;

to fire a second plurality of neurons based at least in part on the second frequency mapped to the second set of frequency bins, each one of the second plurality of neurons corresponding to a frequency bin of the second set of frequency bins, the first plurality of neurons and the second plurality of neurons corresponding to a first layer of neurons of a network, and the at least one processor being further configured to fire the first plurality of neurons and the second plurality of neurons based at least in part on a relative speed of the moving object towards or away from a receiver of the first audio signal and the second audio signal; and to estimate the relative speed of the moving object based on a firing pattern of the first plurality of neurons and the second plurality of neurons and a time difference between firing the first plurality of neurons and the second plurality of neurons.

10. The apparatus of claim 9, in which the at least one processor is further configured:

to receive, at a first plurality of neurons of a second layer, output from the first plurality of neurons of the first layer via a first plurality of synapses, and to receive, at the first plurality of neurons of the second layer, output from the second plurality of neurons of the first layer via a second plurality of synapses, each synapse of the first plurality of synapses and the second plurality of synapses comprising a weight and a delay; and to fire at least one of the first plurality of neurons of the second layer based on an accumulated output from the first plurality of neurons of the first layer and the second plurality of neurons of the first layer.

11. The apparatus of claim 10, in which the at least one processor is further configured to adjust the weight and/or the delay of a synapse based at least in part on a difference in time between firing of the at least one of the first plurality of neurons of the second layer and the at least one of the first plurality of neurons or the second plurality of neurons of the first layer.

12. The apparatus of claim 11, in which the at least one processor is further configured to label a dominant neuron in the second layer for a specific relative speed.

13. The apparatus of claim 10, in which the at least one processor is further configured to receive at a first neuron of the second layer an output from a second neuron of the second layer, in which the output is received via an inhibitory synapse.

14. The apparatus of claim 9, in which each frequency bin of the first set of frequency bins and the second set of frequency bins is nonlinearly mapped to a corresponding frequency.

15. The apparatus of claim 14, in which the mapping is based at least in part on a logarithmic mapping.

16. The apparatus of claim 9, in which each frequency bin of the first set of frequency bins and the second set of frequency bins is linearly mapped to a corresponding frequency.

17. An apparatus for frequency discrimination associated with a Doppler effect, comprising:

means for mapping a first frequency of a first audio signal to a first set of frequency bins of a plurality of frequency bins, each frequency bin of the plurality of frequency bins corresponding to a different frequency, and the first audio signal emitted from a moving object at a first time;

means for mapping a second frequency of a second audio signal to a second set of the plurality of frequency bins, the second audio signal emitted from the moving object at a second time;

means for firing a first plurality of neurons based at least in part on the first frequency mapped to the first set of frequency bins, each one of the first plurality of neurons corresponding to a frequency bin of the first set of frequency bins;

means for firing a second plurality of neurons based at least in part on the second frequency mapped to the second set of frequency bins, each one of the second plurality of neurons corresponding to a frequency bin of the second set of frequency bins, the first plurality of neurons and the second plurality of neurons corresponding to a first layer of neurons of a network, and the means for firing the first plurality of neurons and the second plurality of neurons based at least in part on a relative speed of the moving object towards or away from a receiver of the first audio signal and the second audio signal; and means for estimating the relative speed of the moving object based on a firing pattern of the first plurality of neurons and the second plurality of neurons and a time difference between firing the first plurality of neurons and the second plurality of neurons.

18. A non-transitory computer-readable medium having program code recorded thereon for frequency discrimination associated with a Doppler effect, the program code comprising:

program code to map a first frequency of a first audio signal to a first set of frequency bins of a plurality of frequency bins, each frequency bin of the plurality of frequency bins corresponding to a different frequency, and the first audio signal emitted from a moving object at a first time;

program code to map a second frequency of a second audio signal to a second set of the plurality of frequency bins, the second audio signal emitted from the moving object at a second time;

program code to fire a first plurality of neurons based at least in part on the first frequency mapped to the first set of frequency bins, each one of the first plurality of neurons corresponding to a frequency bin of the first set of frequency bins;

program code to fire a second plurality of neurons based at least in part on the second frequency mapped to the second set of frequency bins, each one of the second plurality of neurons corresponding to a frequency bin of the second set of frequency bins, the first plurality of neurons and the second plurality of neurons corresponding to a first layer of neurons of a network, and the program code to fire the first plurality of neurons and the second plurality of neurons based at least in part on a relative speed of the moving object towards or away from a receiver of the first audio signal and the second audio signal; and program code to estimate the relative speed of the moving object based on a firing pattern of the first plurality of neurons and the second plurality of neurons and a time difference between firing the first plurality of neurons and the second plurality of neurons.

\* \* \* \* \*